United States Patent Office 3,163,660
Patented Dec. 29, 1964

3,163,660
PURIFICATION OF 2,5-DIHYDROFURAN
Max Strohmeyer, Ludwigshafen (Rhine), Germany, and Herbert Friederich, Lake Jackson, Tex., assignors to Badische Anilin- & Soda-Fabrik Aktiengesellschaft, Ludwigshafen (Rhine), Germany
No Drawing. Filed Mar. 28, 1962, Ser. No. 183,052
Claims priority, application Germany, Mar. 30, 1961, B 61,968
10 Claims. (Cl. 260—346.1)

This invention relates to a new process for purifying commercial 2,5-dihydrofuran.

It is known that 2,5-dihydrofuran is a valuable intermediate for the production of insecticides. For this purpose it is first reacted with hexachlorocyclopentadiene. Commercial 2,5-dihydrofuran, such as is obtained by dehydration of butene-(2)-diol-(1,4) in contact with aluminum oxide at elevated temperature, is quite unsuitable for the said purpose. It is possible to obtain a purer 2,5-dihydrofuran from the commercial product by careful distillation, but such distillation is accompanied by loss in yield. Moreover the distillate always contains unknown and troublesome impurities. Diene adducts which are obtained from such distilled 2,5-dihydrofuran and hexachlorocyclopentadiene are therefore strongly colored, in many cases brown to black. Purification of such adducts by crystallization is only possible with great loss in yield.

It is an object of the invention to provide a process by which pure 2,5-dihydrofuran is obtained in high yields from commercial 2,5-dihydrofuran. It is another object of the invention to provide a process by which a 2,5-dihydrofuran is obtained which yields with hexachlorocyclopentadiene a diene adduct which is colorless or at the most only slightly colored.

In accordance with this invention the said objects and advantages are achieved by heating commercial 2,5-dihydrofuran in an aqueous mixture the pH value of which is less than 6.5 and by distillation of this mixture, pure 2,5-dihydrofuran thereby being separated.

2,5-dihydrofuran obtained by this new process gives, when reacted with hexachlorocyclopentadiene, a colorless or pale yellow adduct which may easily be further purified by crystallization if desired.

Commercial 2,5-dihydrofuran which may be purified by the new process may be obtained in conventional manner by dehydration of butene-(2)-diol-(1,4) in contact with dehydration catalysts, such as aluminum oxide, silica gel or boron phosphate, at temperatures between 175° and 210° C. 2,5-dihydrofuran is thus obtained in admixture with water which can be wholly or partly removed by azeotropic distillation, for example with furan as vehicle. In view of the fact that the process according to the invention is carried out in the presence of water, however, at least complete dehydration of the commercial 2,5-dihydrofuran is not necessary. On the other hand it is sometimes recommendable to remove part of the impurities in the commercial 2,5-dihydrofuran by distillation prior to complete purification by the new process.

The essential feature of the present invention is that commercial 2,5-dihydrofuran is heated with water and an acid. It is assumed that an impurity which causes discoloration during the reaction of 2,5-dihydrofuran with hexachlorocyclopentadiene undergoes chemical change during the process according to the invention, for example hydrolysis, and is thereby converted into a readily separable or innocuous compound.

Water is advantageously used in an amount of at least 0.2% by weight with reference to the whole mixture. The upper limit of the amount of water is not critical. For example it is possible to use water and commercial 2,5-dihydrofuran in equal amounts by weight. Such large amounts of water are however not advisable for economical reasons because unnecessarily large amounts of water then have to be separated in the subsequent distillation. For this reason it is advantageous to use 0.5 to 15% by weight of water with reference to commercial 2,5-dihydrofuran.

The pH value of the mixture preferably lies between 0 and 6.0. The nature of the acid by means of which the pH value is set up is not critical. Strong, medium strength and weak inorganic or organic acids may be used. Examples of suitable acids are: sulfuric acid, hydrochloric acid, nitric acid, phosphoric acid, carbonic acid, trichloroacetic acid, formic acid, acetic acid, butyric acid, benzoic acid and naphthoic acid. It is also possible to use compounds which are converted into acids under the conditions of the purification process, for example acid anhydrides, carboxylic acid esters and acid halides. Examples of such substances are: acetic anhydride, phosphoric anhydride, ethyl benzoate, thionyl chloride, phosphorous oxychloride, phosgene, acetyl chloride and benzoyl chloride. In general, the acid is used in an amount of 0.1 to 200% by weight, with reference to 2,5-dihydrofuran. When using strong acids, smaller amounts are usually sufficient, i.e., 0.1 to about 20% by weight with reference to 2,5-dihydrofuran. Larger amounts of acid produce increasing amounts of residue and furan and these byproducts are undesirable. Weak and medium strength acids on the other hand are advantageously added in larger amounts, i.e., in amounts of 2 to 200% by weight with reference to 2,5-dihydrofuran.

The necessary pH value may also be set up by means of ion exchangers containing acid groups, for example sulfonic acid or carboxyl groups. The ion exchangers are advantageously used in amounts of 1 to 30% by weight with reference to the amount of commercial 2,5-dihydrofuran.

A dienophilic compound may be coemployed in the process according to this invention. In this way it is possible to bind small amounts of furan present in commercial 2,5-dihydrofuran, in the form of difficultly volatile diene adducts which can be separated by distillation. The separate addition of an acid and a dienophilic compound is unnecessary if a substance is added which is dienophilic and at the same time has an acid reaction or is converted under the reaction conditions into acid-reaction dienophilic substances. Compounds of this type are especially cis-ethylenedicarboxylic acids-(1,2) and derivatives thereof, such as anhydrides, halides, amides, nitriles and esters, especially those derived from alkanols having one to four carbon atoms. Suitable dienophilic compounds of this type include maleic acid, citraconic acid, cis-aconitic acid and their anhydrides, maleic diamide, diethyl maleate, and citraconic acid dimethyl ester. The preferred substances are maleic acid and maleic anhydride. The dienophilic compounds are used in general in amounts of 0.2 to 10% by weight, preferably 1 to 2% by weight, with reference to the commercial 2,5-dihydrofuran.

The process according to this invention is carried out at a temperature between 40° and 300° C. The period of treatment depends on the temperature and on the degree of contamination and in general varies between about half a minute and five hours. It is simplest to carry out the process at atmospheric pressure. Temperatures of 40° to 100° C., especially between 60° and 70° C., are then prefererd.

The process may be carried out batchwise by heating the mixture in the liquid phase, preferably under reflux. In continuous operation, the mixture is passed through a heated reaction zone at such a low rate (which varies according to the invention) and at such a pressure that it is present in the liquid phase. The necessary pressures are up to 50 atmospheres according to the temperature. It is however also possible to pass the mixture of commercial 2,5-dihydrofuran and acid through the reaction zone in vapor form.

Pure 2,5-dihydrofuran is recovered from the treatment mixture by distillation. If a dienophilic compound has not been coemployed, a small amount of furan is first distilled off in the form of an azeotrope with water. Then 2,5-dihydrofuran follows as the main fraction, while a small amount of constituents which are of higher boiling point or non-distillable remains as a residue.

The invention is illustrated by, but not limited to, the following examples in which parts and percentages are by weight.

Example 1

25 parts of maleic anhydride is added to 1600 parts of commercial 2,5-dihydrofuran which contains 10% by weight of water. The mixture is heated under reflux for an hour and then fractionally distilled. 1368 parts of 2,5-dihydrofuran of the boiling point 66° C. is obtained.

When 272.8 parts of hexachlorocyclopentadiene and 70.0 parts of purified 2,5-dihydrofuran are heated for sixteen hours at 135° C. (cf. J. A. Chem. Soc. 77 (1955), 4157), a pale yellow colored diene adduct is obtained which gives a colorless product after a single recrystallization from acetone with the addition of active carbon.

On the other hand when a product (boiling point at 760 mm. Hg 65.5° to 67° C.) which has been obtained from commercial substantially dehydrated 2,5-dihydrofuran, by rectification is used instead of the said purified 2,5-dihydrofuran, the mixture becomes discolored after only a few hours and after seven hours is brown and after sixteen hours black. This diene adduct can only be obtained in nearly colorless form by repeated recrystallization with great loss in yield.

Similar results are obtained by using, instead of maleic anhydride, 30 parts of maleic acid, 30 parts of citraconic anhydride or 30 parts of dimethyl maleate and, when using dimethyl maleate, continuing heating under reflux for 2½ hours rather than for one hour.

Example 2

200 parts of acetic acid is added to 1000 parts of commercial 2,5-dihydrofuran containing 10% of water and the mixture is refluxed for three hours. The water is distilled off with 5 parts of furan as a vehicle and 860 parts of 2,5-dihydrofuran is obtained. Under the conditions described in Example 1, this gives with hexachlorocyclopentadiene a nearly colorless diene adduct, while the dehydrated starting material gives a brown-black adduct and a distilled product, a dark brown one.

By using 200% acetic acid rather than 20% acetic acid and refluxing for only 1½ hours, or by adding 50 parts of acetic acid and 15 parts of maleic anhydride, the same purification effect is achieved.

Example 3

Commercial 2,5-dihydrofuran containing 8% of water is passed through an empty tube heated to 200° C. together with 200% of acetic acid. The residence time is 2 minutes. The vapor mixture is condensed and the condensate worked up as described above. The 2,5-dihydrofuran thus obtained gives a practically colorless diene adduct with hexachlorocyclopentadiene.

A similar result is achieved by passing a mixture of the same composition in the liquid phase through a reaction tube heated to 180° C. with a residence time of 4 minutes.

Example 4

1000 parts of commercial 2,5-dihydrofuran which has previously been distilled and contains 2% of water is mixed with 20 parts of concentrated sulfuric acid. The mixture is refluxed for 3 minutes and worked up by fractional distillation. The product obtained gives with hexachlorocyclopentadiene a colorless diene adduct.

The same effect is achieved by refluxing commercial 2,5-dihydrofuran containing 8% of water with 20% sulfuric acid for 15 minutes.

Example 5

1000 parts of commercial 2,5-dihydrofuran containing 12% of water and 60 parts of an ion exchanger based on a phenol-formaldehyde resin and containing sulfonic acid groups are heated for one hour at 50° C. The pH is 4. The ion exchanger is then separated by filtration. By distillation, 837 parts of 2,5-dihydrofuran is obtained which gives with hexachlorocyclopentadiene a nearly colorless diene adduct.

We claim:

1. A process for purifying 2,5-dihydrofuran obtained by the catalytic dehydration of butene-(2)-diol-(1,4) which comprises heating said 2,5-dihydrofuran in an aqueous mixture having a pH value of from 0 to 6.5 to a temperature between 40° and 300° C. and recovering pure 2,5-dihydrofuran by distilling said mixture.

2. A process as claimed in claim 1 wherein a dienophilic compound is coemployed.

3. A process as claimed in claim 1 wherein the pH value of the mixture is adjusted by means of a substance selected from the group consisting of cis-ethylenedicarboxylic acids-(1,2) and derivatives thereof which are converted under the conditions of the process into cis-ethylenedicarboxylic acids-(1,2).

4. A process as claimed in claim 1 wherein the mixture contains 0.5 to 15% by weight of water with reference to commercial 2,5-dihydrofuran.

5. A process as claimed in claim 1 wherein the heating is carried out at atmospheric pressure at a temperature of between 60° and 70° C.

6. A process for purifying 2,5-dihydrofuran obtained by the catalytic dehydration of butene-(2)-diol-(1,4) which comprises heating the same with water and maleic anhydride at a pH value of from 0 to 6.5 and thereafter distilling off pure 2,5-dihydrofuran from the mixture.

7. A process as claimed in claim 1 wherein the pH value of the mixture is adjusted by adding an acid in an amount of 0.1 to 200% by weight with reference to 2,5-dihydrofuran.

8. A process as claimed in claim 1 wherein the pH value of the mixture is adjusted by adding an acid selected from the group consisting of weak and medium strength acid in an amount of 2 to 200% by weight with reference to 2,5-dihydrofuran.

9. A process as claimed in claim 1 wherein the pH value is adjusted by adding a strong acid in an amount of 0.1 to 20% by weight with reference to 2,5-dihydrofuran.

10. A process as claimed in claim 1 wherein the pH value of the mixture is adjusted by using an ion exchanger containing acid groups.

References Cited in the file of this patent

FOREIGN PATENTS 886,304    Germany _____ Aug. 13, 1953